(12) United States Patent
Hidayat

(10) Patent No.: US 9,038,033 B1
(45) Date of Patent: May 19, 2015

(54) TECHNIQUES AND MECHANISMS FOR WEB APPLICATION MINIFICATION

(75) Inventor: Ariya Hidayat, Mountain View, CA (US)

(73) Assignee: Sencha, Inc., Redwood City, CA (US)

( * ) Notice: Subject to any disclaimer, the term of this patent is extended or adjusted under 35 U.S.C. 154(b) by 176 days.

(21) Appl. No.: 13/315,918

(22) Filed: Dec. 9, 2011

(51) Int. Cl.
*G06F 9/44* (2006.01)
*G06F 9/45* (2006.01)

(52) U.S. Cl.
CPC . *G06F 8/433* (2013.01); *G06F 8/33* (2013.01)

(58) Field of Classification Search
None
See application file for complete search history.

(56) References Cited

U.S. PATENT DOCUMENTS

| | | | | |
|---|---|---|---|---|
| 6,026,413 | A * | 2/2000 | Challenger et al. | 717/108 |
| 6,427,234 | B1 * | 7/2002 | Chambers et al. | 717/140 |
| 7,100,164 | B1 * | 8/2006 | Edwards | 718/108 |
| 7,409,676 | B2 * | 8/2008 | Agarwal et al. | 717/120 |
| 8,117,606 | B2 * | 2/2012 | Chakrabarti et al. | 717/156 |
| 8,132,180 | B2 * | 3/2012 | Agarwal et al. | 719/316 |
| 8,490,055 | B2 * | 7/2013 | Basak | 717/123 |
| 2003/0115545 | A1 * | 6/2003 | Hull et al. | 715/500 |
| 2003/0221162 | A1 * | 11/2003 | Sridhar | 715/501.1 |
| 2006/0143596 | A1 * | 6/2006 | Miyashita et al. | 717/131 |
| 2006/0294150 | A1 * | 12/2006 | Stanfill et al. | 707/200 |
| 2010/0042974 | A1 * | 2/2010 | Gutz et al. | 717/121 |
| 2012/0072887 | A1 * | 3/2012 | Basak | 717/123 |
| 2012/0096433 | A1 * | 4/2012 | Reinhold et al. | 717/120 |
| 2013/0061207 | A1 * | 3/2013 | Chamieh et al. | 717/116 |
| 2013/0212563 | A1 * | 8/2013 | Kraft | 717/123 |
| 2013/0232475 | A1 * | 9/2013 | Chamieh et al. | 717/140 |
| 2013/0290936 | A1 * | 10/2013 | Rhee et al. | 717/128 |

\* cited by examiner

*Primary Examiner* — Isaac T Tecklu
(74) *Attorney, Agent, or Firm* — Hickman Palermo Becker Bingham LLP; Adam C. Stone

(57) ABSTRACT

Techniques for minifying a client-side web application are described. In one embodiment, a computer-implemented method includes performing a static analysis of a set of files written in a dynamic programming language that make up the web application. A single minified web application file is generated based on a traversal of a dependency graph that includes, in proper dependency order, components that are needed at runtime and does not include components of the set of files that will not be needed at runtime. The single minified web application file may be delivered to end user computing devices in place of the original set of files without loss of web application functionality.

16 Claims, 3 Drawing Sheets

TECHNIQUES AND MECHANISMS FOR WEB APPLICATION MINIFICATION

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to developing web applications, and more particularly, to the building a minified web application.

BACKGROUND

Web application frameworks are well known in the art. Web application frameworks are used by many web application developers to develop dynamic websites and richly featured web applications, and to reduce the complexity and time involved in web application development. Typically, a web application framework provides a library of reusable and extendable software components for common web application functions such as database access, obtaining user input, displaying data, and other functions. A developer, when creating a web application, may author components that use or extend one or more components of the library at runtime.

Web application frameworks are becoming more popular for building web applications that are executed by end user computing devices (e.g., laptop computers, desktop computers, smart phones, tablet computers, or other personal computing devices). These applications are typically written in a dynamic programming language such as Javascript, Jscript, ActionScript, or other language that can be interpreted and executed at runtime by a dynamic programming language runtime interpreter (e.g., a scripting engine of a web browser) installed on the end user's computing device.

Interpreting a component written in a dynamic programming language at runtime involves the runtime interpreter parsing and compiling language instructions that define the component to produce an intermediate form of the component (e.g. bytecode instructions) that can be more efficiently executed by the runtime interpreter than the original programming language instructions.

One problem associated with using a web application framework for building web applications is that the library of the framework often contains many components that are not used or extended at runtime by a given web application. Thus, the initialization time of the web application at the end user's computing device may be increased as a result of downloading and interpreting these unneeded components. This is unfortunate because typically the end user must wait until the web application has been initialized before the end user can begin using the web application. If this wait is long, the end user may become dissatisfied or frustrated with the web application. Further, downloading and interpreting unneeded components are wasteful of network resources and data storage and processing resources of the end user's computing device.

The interpretable instructions of a web application written in a dynamic programming language may be compressed by any of several well-known data compression techniques, such as removing white-space characters and comments from instructions and shortening variable and component names or by applying other data compression algorithms (e.g., gzip). These compression techniques, however, are incomplete. In particular, these techniques retain components of the web application framework library that are not needed at runtime. These unneeded components may amount to a substantial portion of the web application even after data compression techniques have been applied.

Based on the foregoing, web application developers and end users of web applications would appreciate techniques and mechanisms that further reduce the size of web applications built using a web application framework, thereby further reducing web application download and initialization time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF AN EMBODIMENT

The foregoing needs are addressed by the present invention, which comprises, in an embodiment, a method for minifying a client-side web application.

The method includes performing a static analysis of a set of files written in a dynamic programming language that make up the web application. The set of files includes a set of application files authored by a web application developer and a set of library files of a web application framework. The dynamic programming language may be Javascript, Jscript, or ActiveScript. The static analysis produces runtime dependency information that identifies components contained in the set of files and identifies runtime dependencies between the identified components. A component may correspond to a class definition contained in the set of files or a prototype definition contained in the set of files.

The dependency information represents a dependency graph of identified components. The graph is traversed in to identify which of the identified components are needed at runtime. A single minified web application file is generated based on the traversal of the dependency graph that includes, in proper dependency order, components that will be needed at runtime and does not include components of the set of files that will not be needed at runtime. The single minified web application file may be delivered/downloaded to end user computing devices in place of the original set of files without loss of web application functionality.

The aforementioned method may be performed by a computing device having one or more processors, memory and one or more modules, programs or sets of instructions stored in the memory for performing this method.

Instructions for performing the aforementioned method may be included in a computer program product configured for execution by one or more processors. In some embodiments, the executable computer program product includes a non-transitory computer readable storage medium (e.g., one or more magnetic disk storage devices, flash memory devices, or other non-volatile solid state memory devices) and an executable computer program mechanism embedded therein.

BRIEF DESCRIPTION OF THE DRAWINGS

The present invention is illustrated by way of example, and not by way of limitation, in the figures of accompanying drawings and in which like reference numerals refer to similar elements and in which.

DESCRIPTION OF EMBODIMENTS

Techniques and mechanisms are described for building a minified web application. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Sample Web Application Minifier Device

Figure 1:
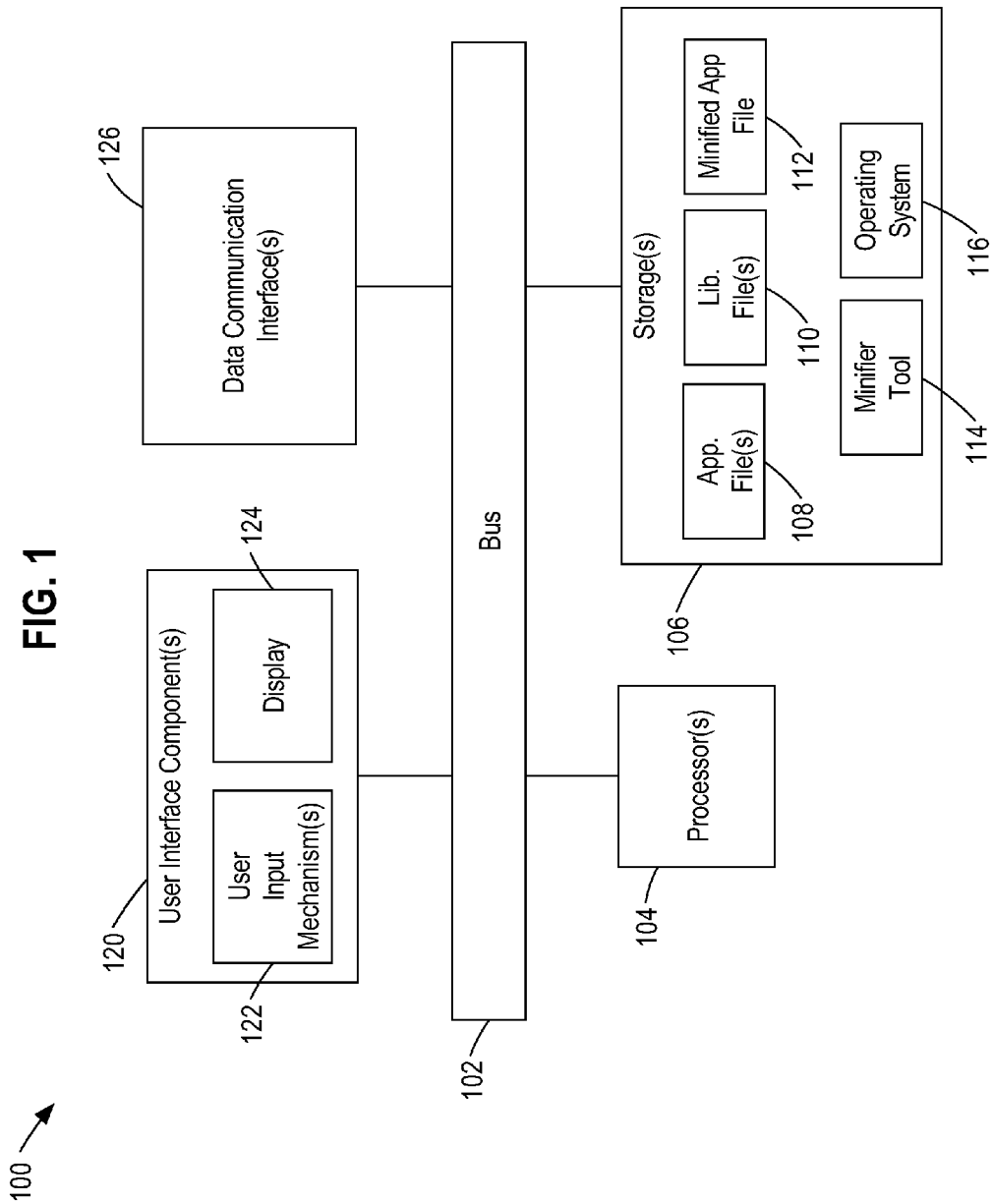
FIG. 1 is a block diagram a computing device suitable for implementing some embodiments of the invention.

FIG. 1 illustrates an example web application minifier computing device, according to some embodiments of the invention. The device 100 includes a bus 102 that facilitates information exchange between components connected to the bus 102. One or more processors 104 coupled to the bus 102 execute instructions and process information. One or more storages 106 (also referred to herein as non-transitory computer-readable media) are coupled to the bus 102. Storage(s) 106 may be used to store executable programs (e.g., binaries, bytecode, scripts, etc.), permanent data, temporary data that is generated during program execution, and any other information needed to carry out computer processing.

Storage(s) 106 may include any and all types of storages that may be used to carry out computer processing. For example, storage(s) 106 may include main memory (e.g. random access memory (RAM) or other dynamic storage device), cache memory, read only memory (ROM), permanent storage (e.g. one or more magnetic disks or optical disks, flash storage, etc.), as well as other types of storage. Storage(s) 106 may also include external storage (e.g., network attached storage (NAS), direct-attached storage (DAS), storage area network (SAN), etc.) coupled to the device 100 via data communication interface(s) 126.

The various storages 106 may be volatile or non-volatile. Common forms of non-transitory computer-readable media include, for example, a floppy disk, a flexible disk, hard disk, magnetic tape, or any other magnetic medium, a CD-ROM, DVD, or any other optical storage medium, a RAM, a PROM, an EPROM, a FLASH-EPROM or any other type of flash memory, any memory chip or cartridge, and any other storage medium from which a computer can read.

Storage(s) 106 store several sets of executable instructions, including an operating system 116 (e.g., a UNIX-based, OS X-based, or WINDOWS operating system) and a web application minifier tool 114. The processor(s) 104 execute the operating system 116 to provide a platform on which other sets of software may operate, and execute the minifier tool 114 to provide additional, specific functionality described in greater detail below.

In some embodiments of the invention, the minifier tool 114 and the operating system 116 cooperate to implement the techniques described herein. That is, portions of the techniques may be performed by the tool 114 and portions may be performed by the operating system 116. It should be noted though that this is just one possible divisional of functionality. As an alternative, all of the techniques may be performed by the operating system 116. As a further alternative, all of the techniques may be performed by the minifier tool 114. All such possible implementations are within the scope of the present invention.

The processor(s) 104 and the executable instructions 114 and/or instructions 116 may be thought of as forming a web application minifier that implements the techniques described herein. In such an implementation, the processors(s) 104 may be thought of as being "configured" by the executable instructions 114 and/or instructions 116 to carry out the techniques. This is just one possible implementation for the web application minifier. As an alternative, the web application minifier may be hardware implemented using a device (e.g. a programmable logic array) having an array of elements, including logic elements, wherein the elements are programmed or configured to implement the techniques described herein. As a further alternative, the web application minifier may be hardware implemented by way of another device such as an application specific integrated circuit (ASIC) having elements, including logic elements, that are constructed/configured to implement the techniques described herein. Overall, the web application minifier may be hardware implemented using any number of devices with elements, including logic elements, that are constructed/configured to implement the techniques described herein. These and other implementations of the web application minifier are possible. All such implementations are within the scope of the present invention.

Storage(s) 106 may also store several sets of files, including web application file(s) 108, client-side web application framework library files 110 and minified application file 112. The web application file(s) 108 and the library files 110 are inputs to the web application minifier. The minified application file 112 is an output of the web application minifier.

The device 100 further comprises one or more user interface components 120 coupled to the bus 102. These components 120 enable the device 120 to receive input from and provide output to a user. On the input side, the user interface components 120 may include input mechanism(s) 122, for example, a keyboard/keypad having alphanumeric keys, a cursor control device (e.g. mouse, trackball, touchpad, etc.), a touch sensitive screen capable of receiving user input, a microphone for receiving audio input, etc. On the output side, the components 120 may include a graphical interface (e.g. a graphics card) and an audio interface (e.g. sound card) for providing visual and audio content. The user interface components 120 may further include a display 124 (in one embodiment, the display 122 is a touch sensitive display) for presenting visual content.

In some embodiments, the web application minifier executed by the processor(s) 104 may provide a software user interface that takes advantage of and interacts with the user interface components 120 to receive input from and provide output to a user. This software user interface may, for example, provide menus that the user can navigate using one of the user input devices mentioned above, soft buttons that can be invoked via touch, a soft keyboard, etc. This software interface may also interact with a touch sensitive display to receive information indicating which location(s) of the touch sensitive display is being touched by the user and to translate this information into input that the web application minifier can use (e.g. to determine which menus are selected, which soft buttons are depressed, etc). The software user interface provided by the web application minifier may alternatively take the form of a command line interface. This command line interface may, for example, provide a way for a user to invoke the web application minifier functionality and provide input to the web application minifier in the form of command line arguments. These and other functions may be performed by the software user interface provided by the web application minifier.

In addition to the components set forth above, the device 100 may further comprise one or more data communication interfaces 126 coupled to the bus 102. These interfaces 126 enable the device 100 to communicate with other components. The communication interfaces 126 may include, for example, a network interface (wired or wireless) for enabling the device 300 to send messages to and receive messages from a data network such as, for example, a Local Area Network (LAN). The communications interfaces 126 may also include a 3G or 4G interface for enabling the device 100 to access the Internet without using a local network. The communication interfaces 126 may further include a telephone network interface for enabling the device 100 to conduct telephone communications. The communication interfaces 126 may further include a wireless interface (e.g. Bluetooth) for communicating wirelessly with nearby devices, such as wireless headsets, earpieces, etc. The communication interfaces 126 may further comprise a jack for interfacing with a set of wired headphones, headsets, earphones, etc. These and other interfaces may be included in the device 100.

Client-Side Web Application

A client-side web application developed by a web application developer may include a number of files 108 that the developer authors and a number of files 110 of a web application framework. Collectively, files 108 and files 110 are referred to hereafter as the "web application files".

A web application file may contain instructions formatted in accordance with a dynamic programming language. For purposes of this disclosure, a dynamic language is any computer programming or scripting language for which applications written in the language need not be first compiled by the programmer into an executable or intermediate form before the functionality of the applications can be carried out by the end user's computing device. Non-limiting examples of dynamic languages within the scope of the present invention include Javascript, Jscript, and ActionScript.

It should be noted that a dynamic programming language runtime interpreter (e.g., a scripting engine of a web browser) installed on the end user's computing device, when interpreting instructions of a web application written in a dynamic language, may compile the instructions into an executable or intermediate form for faster execution. This compilation process is typically performed by the interpreter as part of initializing the web application and involves the interpreter scanning and parsing the instructions of the web application. Scanning and parsing instructions that will not be executed is wasteful of the end user computing device's system resources. Techniques and mechanisms described herein may be employed to avoid this unnecessary scanning and parsing.

The dynamic language may be an object-oriented language that facilitates well-known object-oriented programming features such as encapsulation, inheritance, or polymorphism. In some embodiments, the dynamic language is a prototype-based object-oriented language. In other embodiments, the dynamic language is a class-based object-oriented language. For the purposes of the present invention, the distinction between class and prototype is unimportant and the techniques and mechanisms described herein can be applied to either prototype-based object-oriented dynamic languages or class-based object-oriented dynamic languages.

Typically, with prior approaches for delivering web applications written in a dynamic language to an end user computing device, a markup language document (e.g., a HyperText Markup Langue (HTML) document or an eXtensible HyperText Markup Language (XHTML) document) that references directly or indirectly each of the web application files 108 and 110 is first delivered by a server computing device to the end user computing device. When the markup language document is processed by a web browser executing on the end user computing device, this causes each and every web application file 108 and 110 be downloaded from a server computing device to the end user computing device.

There are a number of inefficiencies with this delivery approach. For one, there is generally greater processing overhead associated with a client requesting multiple files from a server as opposed to requesting a single file from a server. This is so even if the size of the single file equals the sum of the sizes of each of the multiple files because the client must identify in network communications (e.g., multiple HTTP messages or connections) each of the multiple files to the server as opposed to identifying just the single file.

Another inefficiency with this approach is that the client may download library files 110 that go unused during execution of the web application at the end user computing device. Downloading these used library files 110 is wasteful of both network resources between the client and the server and of storage space on the client. This downloading is especially wasteful on mobile client computing devices such as smart phones and tablet computers where available local storage space may be limited.

Web Application Components

The term "web application component" or just "component", as used herein, refers to a definition in a dynamic language of an equivalence class of all data objects that share the same possible state and methods. For example, a component may correspond to a class definition or a prototype definition in a web application file.

A component may be contained in a web application file. The set of components contained in library files 110 typically does not vary from web application to web application. On the other hand, the components or components contained in the application files 108 typically vary substantially between different web applications. Further, many components contained in the library 110 are often unneeded at runtime by a given web application. In other words, the given web application will need at runtime only some but not all of the components contained in the library files 110. Thus, it is wasteful of computing resources to deliver unneeded library components to end user computing devices when a web application is downloaded. Further, as mentioned previously, delivering unneeded library components may result in increased web application initialization or start-up time.

Component and Component Name

As mentioned, the web application files 108 and 110 may contain one or more components. A component may have a declared name that uniquely identifies the component among all other components in the web application files 108 and 110. For example, the following example Javascript component has the declared name ("employee"):

01: function employee(name, jobtitle, birthdate)
02: {
03: this.name=name;
04: this.jobtitle=jobtitle;
05: this.birthdate=birthdate;
06:}

The above is just one example of how a component and a component name may be declared in a web application file 108 or 110 and the invention is not limited to the above manner of component and component name declaration. For example, the framework library may provide a helper routine for declaring a component such as the ('Ext.define') helper routine at line 01 in the following example Javascript code that declares a component with the component name ('Ext.Window'):

01: Ext.define('Ext.Window', {
02: // further component specific instructions
03:});

During static analysis of the web application files 108 and 110, the minifier parses the web application files 108 and 110 to identify the components declared therein. The minifier may identify the components by parsing the files 108 and 110 for certain code patterns that are indicative of a component declaration. The code patterns that the minifier parses the web application files 108 and 110 for to identify components may vary depending on a variety of intrinsic factors of the web application files 108 and 110 including the particular dynamic language in which the files are authored, calling conventions used by the particular web application framework providing the library files 110, helper routines provided by the web application framework, and others. However, it should be understood that the minifier of the present invention is not limited to any particular set or type of code patterns and any parse-able set or type of code patterns that may be used to identify components may be used. All such code patterns are within the scope of the invention.

Component Runtime Dependencies

A component contained in a web application file 108 or 110 may have a runtime dependency on another component contained in a web application file 108 or 110. The web application minifier of the present invention performs a static analysis of the web application files 108 and 110 to identify runtime dependencies between components contained in the web application files 108 and 110. Results of this static analysis may be used by the minifier to produce a minified web application file 112.

A component that depends on another component is referred to herein as a "dependent" component. A component on which a dependent component depends is referred to herein as a "base" component. A component can be both a base component and a dependent component if the component both depends on another component and another component depends on it. A component on which no other component depends is referred to herein as a "leaf" component. A leaf component can also be a dependent component.

Generally, for the purpose of the present invention, a component A has a runtime dependency on another component B where the ability of the dynamic programming language runtime interpreter to successfully interpret component A without generating a runtime error depends on the prior successful runtime interpretation of component B.

For purposes of this disclosure, interpreting a component refers to the runtime scanning and parsing by the runtime interpreter of dynamic programming language instructions that declare and define the component. A component can be said to have been successfully interpreted at runtime if the runtime interpreter is able to create a runtime definition of the component in a runtime namespace. Once a runtime definition exists for a component, the component may be executed by the runtime interpreter and other dependent components can use or extend the defined component.

Two types of runtimes dependencies are of interest to the minifier. One type, referred to herein as a "uses" runtime dependency, exists when a component A, when executed by the runtime interpreter, creates or instantiates an instance of another component B. In this case, component B must have been successfully interpreted before component A can create an instance of component B. It should be noted that before component A can use component B at runtime, component A must have been previously successfully interpreted by the runtime interpreter. However, while component B must have been successfully interpreted before component A can use component B, component B need not have been previously executed by the interpreter before component A can use component B.

The other type of runtime dependency, referred to herein as an "extends" runtime dependency, exists when a component A, when interpreted by the runtime interpreter, inherits from, extends, or sub-classes the definition of another component B. In this case, component B must have been successfully interpreted before component A can be successfully executed. Neither component A nor component B need be executed before component A can extend component B.

Both the uses and extends types of runtime dependencies may be detected by the minifier by parsing the web application files 108 and 110 for certain scripting code patterns that are indicative of the dependencies.

The code patterns that the minifier parses the web application files 108 and 110 for to identify runtime dependencies may vary depending on a variety of intrinsic factors of the web application files 108 and 110 including the particular web browser scripting language in which the files are authored, calling conventions used by the particular web application framework providing the library files 110, helper routines provided by the web application framework, and others. However, it should be understood that the minifier of the present invention is not limited to any particular set or type of code patterns and any parse-able set or type of code patterns that may be used to identify uses and extends runtime dependencies between components may be used. All such code patterns are within the scope of the invention.

For example, the following Javascript code pattern includes the ("new") keyword and indicates that the component containing this line of Javascript code has a "uses" runtime dependency on the ("List") component.

01: var list=new List( );

As another example, the following Javascript code pattern includes the ("extend") keyword and indicates that the ("CustomList") component has an "extends" runtime dependency on the ("List") component.

01: var CustomList=List.extend({
02: render: function( ){
03: // perform customized rendering here
04:}
05:});

Code patterns may be identified by the minifier using any number of well-known parsing techniques. For example, the minifier may build a syntax tree from a lexical analysis of the web application files 108 and 110 and from the syntax tree identify code patterns that are indicative of component declarations and runtime dependencies. Other programming or scripting language parsing techniques may be used and all such techniques are within the scope of the invention.

Runtime Dependency Information

As output of the static analysis of the web application files 108 and 110, the minifier produces runtime dependency information about the components contained in the files 108 and 110 and the runtime dependencies between them. The runtime dependency information may take the form of one or more data structures that are stored in storage(s) 106. Any suitable data structure may be used.

In some embodiments, the runtime dependency information maps a component contained in the files 108 and 110 to that component's direct runtime dependencies, if the component has any direct runtime dependencies. A component A's direct runtime dependencies are the set of components that component A either uses or extends at runtime as indicated by the dynamic programming language instructions that defined the component A.

Any number of suitable data structures may be used by the minifier to store the dependency information in storage(s) 106. In some embodiments, the data structure is one or more hashing structures where the keys to the hashing structures are component identifiers (e.g., component names). The value of a key for a component includes a list of the component identifiers that are the component's direct dependencies as determined by the minifier from the static analysis of the web application files 108 and 110. The value of a key for a component may also include other information about the component such as the file name or file path of the web application file 108 or 110 that contains the component and, possibly, line number information for identifying the code block declaration of the component in the web application file 108 or 110 that contains the component.

Dependency information generated by the minifier may be cached in storage(s) 106 so that the dependency information need not be re-generated during subsequent invocations of the minifier. This is especially useful for dependency information generated for components contained in the library files 110. Typically, the web application developer does not make any changes to the language instructions of components contained in the library files 110 when developing a web application. Further, the components contained in the library files 110 typically do not have runtime dependencies on a component contained in the application files 108. Thus, generation of runtime dependency information for components contained in the library files 110 can be performed once by a first invocation of the minifier and thereafter re-used during second and subsequent invocations of the minifier without the minifier having to re-generate the runtime dependency information for components contained in the library files 110. The minifier can re-use this dependency information even for different sets of application files 108 and thus, different web applications.

Leaf Application Components

The application files 108 may contain one or more leaf components. That is, one or more components that no other components in the application files 108 or the library files 110 have a runtime dependency on. Since no other components have a runtime dependency on leaf components contained in the application files 108, the minifier does not need to ensure that these leaf components are interpreted at runtime before any other components contained in the web application files 108 and 110.

Sample Operation

With the above description in mind, and with reference to FIGS. 1-3, the operation of device 100 in accordance with some embodiments of the present invention will now be described in yet greater detail. In the following description, the operations will be described as being performed by the device 100. It should be understood that, in one embodiment, the device 100 performs these operations by having the processor(s) 104 execute the operating system 116 and the minifier tool 114, and having the processor(s) 104 interact with the various other components (e.g. display 116, etc.).

Figure 2:
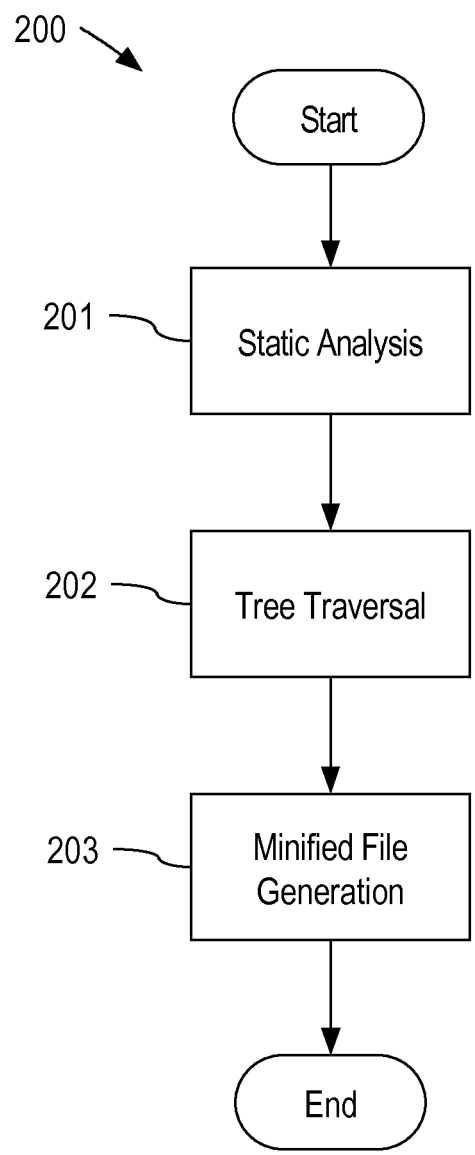
FIG. 2 is a flowchart of a web application minification process according to some embodiments of the invention.

With reference to FIG. 2, there is shown a flow diagram illustrating the web application minification operations performed by the device 100, in accordance with some embodiments of the present invention. To invoke these operations, a user may interact with a user interface displayed on display 124 using input mechanisms 122 to command the device 100 to perform the operations After that is done, the device 100 will perform the operations shown in FIG. 2. The user interface may be graphical or command line based. Input to the operations is the set of web application files 108 and 110. Output of the operations is a single minified web application file 112 that may be delivered to end user computing devices in place of the web application files 108 and 110.

The operations of FIG. 2 described below are not exclusive of data compression operations such as whitespace removal and comment removal. Such data compression operations may be performed by the device 100 in conjunction with the operations of FIG. 2 when generating the minified file 112, performed by the device 100 or other device on the web application files 108 and/or 110 prior to the device 100's performance of the operations of FIG. 2, or performed by the device 100 or other device on the minified web application file 112 after the device 100's performance of the operations of FIG. 2.

The device 100 may obtain the input web application files 108 and 110 in any suitable manner and the present invention is not limited to any particular manner for obtaining the input web application files 108 and 110. For example, the user may specify a file system path or paths to the web application files 108 and 110 as they are stored in storage(s) 106 as input to a user interface displayed on display 124. As an alternative example, the storage(s) 106 may store a configuration file that specifies the file system path or paths and from which the device 100 can determine the file system location or locations of the web application files 108 and 110. These are just two examples. Other ways of providing the web application files 108 and 110 as input to the device 100 may be used and all such ways are within the scope of the invention.

Static Analysis

The device 100 performs (block 201) a static analysis of each web application file 108 and 110. A purpose of the static analysis is to identify the components contained in the files 108 and 110. Identification of a component contained in a file 108 or 110 includes parsing the file to identify a code pattern or calling convention that is indicative of a component declaration. Identification of a component contained in a file 108 or 110 may include identifying the component's name or identifier, the name of the file 108 or 110 that contains the component, and the portion of the file 108 or 110 that contains the component declaration. Identification of the portion of the file may be by line number, byte offset, character offset, or any other suitable manner for identifying the portion of a file that contains a component declaration. Identification of the portion of the file may be unnecessary if the file 108 or 110 containing the identified component contains only that component. In this case, identification of a component may include just identifying the component's name or identifier and the file 108 or 110 that contains the component.

Another purpose of the static analysis is to identify the direct runtime dependencies of each component contained in the files 108 and 110. Identification of a component's direct runtime dependencies includes parsing the file 108 or 110 that contains the component or the portion of the file 108 or 110 that contains the component to identify code patterns or calling conventions that are indicative of direct runtime dependencies that the component has. In particular, the parsing identifies uses and extends runtime dependencies that the component has on other components. Identification of a component's direct runtime dependencies includes identifying the component names or identifiers of the each of the component's direct runtime dependencies.

Yet another purpose of the static analysis of the files 108 and 110 is to produce runtime dependency information that identifies the components contained in the files 108 and 110 and the direct runtime dependencies between components.

This runtime dependency information represents a dependency graph of runtime dependencies between the components contained in the files 108 and 110 and is used during the dependency graph traversal step (block 202) to determine the components contained in the files 108 and 110 that are needed at runtime and those that will not be needed. The runtime dependency information produced during by the static analysis may be stored in storage(s) 106.

In some embodiments, two sets of runtime dependency information are produced by the static analysis. One set for the application files 108 and another set of the library files 110. As mentioned previously, the runtime dependency information produced for the library files 110, once generated, may be cached or stored in storage(s) 106 where it can be re-used for subsequent performance of the web application minification operations of FIG. 2. For each of these subsequent performances, only the application files 108 need be statically analyzed and the library files 110 do not need to be statically analyzed. Typically, the number of components in the application files 108 is much smaller than the number of components in the library files 110. Thus, reusing runtime dependency information generated for the library files 110 in subsequent performances of the minification operations can make these subsequent performances more efficient.

In some embodiments, runtime dependency information generated by the static analysis is stored in a data structure that is suited for efficiently determining runtime dependency information for a given component. This data structure may be a hash table, associative array, data dictionary, or other suitable data structure in which a component name or identifier is provided as input to the data structure and used to efficiently determine the runtime dependency information generated by the static analysis for that component.

Figure 3:
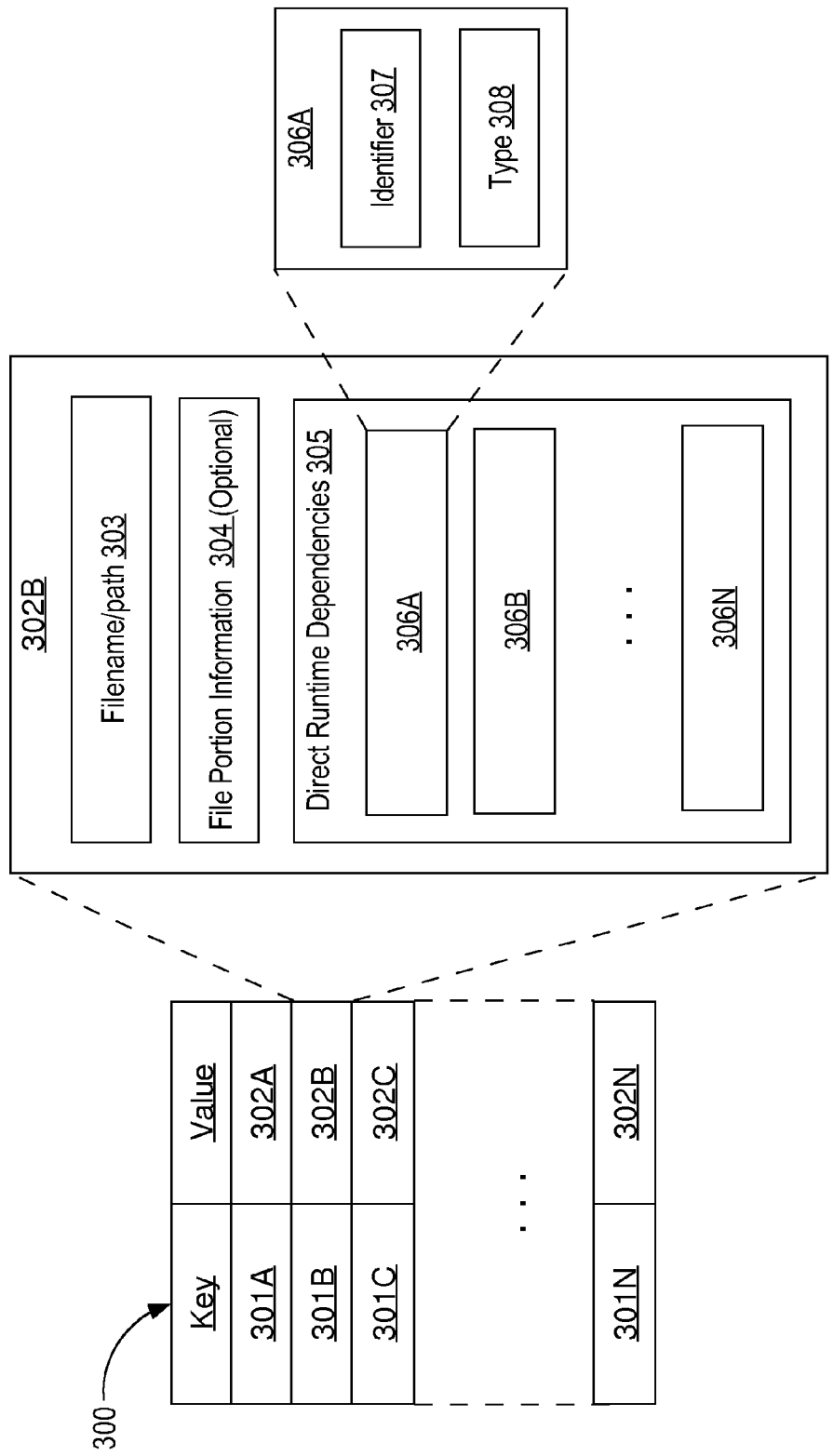
FIG. 3 is a block diagram of a data structure for storing component runtime dependency information according to some embodiments of the invention.

FIG. 3 is a block diagram of an example data structure 300 suitable for storing runtime dependency information generated by the static analysis of the files 108 and 110 according to some embodiments of the invention. In some embodiments, one data structure 300 is generated for the library files 110 and another data structure 300 is generated for the application files 108. Data structure 300 may be stored in storage(s) 106 where it can be accessed during the subsequent tree traversal operation (block 202).

In FIG. 3, table 300 represents a hash table or other hashing data structure. The table 300 has keys 301A-N and corresponding values 302A-N. Each key 301 is an identifier or name of a component identified in a file 108 or 110 by the static analysis. The value 302 corresponding to a key 301 in the table 300 is a data object 302 that contains runtime dependency information about the corresponding component. In particular, the data object 302 for a component may contain such information as the file name or file path 303 of the web application file 108 or 110 that contains the dynamic programming language instructions of the component. In addition and optionally, the data object 302 for a component may contain file portion information 304 that identifies the portion of the file 303 that contains the component. Such file portion information 304 may include line numbers, byte offset and length information, character offset and number of characters information, or any other information suitable for identifying the portion of the file 303 that contains the component.

Data object 302 may also include a list of direct runtime dependencies 305 that the component has, as determined by the static analysis (block 201). The list 305 may be populated with direct runtime dependency data objects 306A-N. Each direct runtime dependency data object 306 represents a component that the component corresponding to the data object 302 has a direct runtime dependency on. Each direct runtime dependency data object 306 may contain an identifier 307 of the component (e.g., the name of the component) that the component corresponding to the containing data object 302 has a direct runtime dependency on. An identifier 307 may also correspond to a key 301 in the data structure 300. The direct runtime dependency data object 306 may also include data 308 that indicates the type of direct runtime dependency. In particular, whether the direct runtime dependency is a "uses" or "extends" type of runtime dependency. Other information may be included in a data object 302 and a data object 302 is not limited to containing only the information shown in FIG. 3.

Dependency Graph Traversal

Once the static analysis (block 201) has produced direct runtime dependency information for components contained in the web application files 108 and 110, the information is used to identify the set of components contained in the web application files 108 and 110 that are needed at runtime and that should be included in the minified web application file 112 excluding those components contained in the web application files 108 and 110 that will not be needed runtime. This identification process represents a traversal of a directed graph in which a node of the graph represents a component identified in the web application file 108 and 110 by the static analysis and a directional link from one node A in the graph to another node B in the graph represents a direct runtime dependency that the component A has on component B.

The traversal of the directed graph is implemented by a topological sorting algorithm that produces as output a linear ordering of components such that for at least any "extends" type direct runtime dependency in which component A "extends" component B, component B comes before component A in the linear ordering. The input to the topological sorting algorithm is a set of components identified in the application files 108 that contains at least the set of leaf application components. If the graph is not a directed acyclic graph (i.e., the graph has at least one directed cycle), then the topological sorting algorithm may produce an error. Any number of different topological sorting algorithms may be used so long as the algorithm produce that produce as output a linear ordering of components such that for at least any "extends" type direct runtime dependency in which component A "extends" component B, component B comes before component A in the linear ordering.

For example, consider the following components and their direct runtime dependencies in which the CustomList component is defined in an application file 108 and the List, ScrollView, and IconGallery components are defined in one or more library files 100:

List extends ScrollView
CustomList extends List
CustomList uses IconGallery

According to some embodiments, the linear ordering produced by the topological sorting algorithm is as follows:

1. ScrollView
2. List
3. CustomList

The CustomList component has a "uses" type direct runtime dependency on the IconGallery component. Thus, the IconGallery component must be included in the minified file 112. However, since no component has an "extends" type direct runtime dependency on the IconGallery component, the IconGallery component can appear anywhere in the minified file 112. This is possible because the CustomList component does not use the IconGallery component until the CustomList component is executed which is after all components in the minified file 112 including the CustomList and the IconGallery components have been successfully interpreted.

Minified File Generation

After the dependency graph traversal, a minified file 112 is generated (block 203) that includes the set of components identified in the application files 108 that were provided as input to the topological sorting algorithm and all of the input set of components' direct and indirect runtime dependencies. The linear ordering produced by the topological sort is preserved in the minified file 112 such that if a component A is before component B in the linear ordering, component A is defined in the file 112 before component B is defined in the file. In this way, the minified file 112 will define components in proper dependency order with respect to the "extends" type runtime dependency. As mentioned previously, components on which there is only a "uses" type runtime dependency can be included anywhere in the minified file 112.

Example Minification

Consider an example of the minification process of FIG. 2. Suppose a library file 110 includes at least the following components and runtime dependencies and may include other components that are not needed by the web application:

List extends ScrollView
IconGallery

Now suppose an application file 108 includes the following components and runtime dependencies:

CustomList extends List and uses IconGallery

According to some embodiments, the CustomList component is provided as input to a topological sort and the following minified file 112 is produced with the component definitions occurring within the minified file 112 in the listed order:

1. ScrollView
2. List
3. CustomList
4. IconGallery

It should be noted that in the above-example, the IconGallery component definition could occur anywhere within the minified file 112 because there is only a uses direct runtime dependency on the IconGallery component and the IconGallery component does not have an extends direct runtime dependency on another component.

Dependency Verification

In some embodiments, the process of FIG. 2 includes a verification step performed after the tree traversal (block 202) and before the minified file generation (block 203) in which the minifier attempts to verify that every "extends" type direct runtime dependency is properly reflected in the linear ordering of components produced by the topological sort. The verification process determines, from the dependency information produced by the static analysis (block 201), each direct runtime dependency in which a component A "extends" a component B and, if both component A and component B exist in the linear ordering, verifies that component B comes before component A in the linear ordering. The minifier generates an error message if this verification fails for any "extends" type direct runtime dependency reflected by the dependency information in which a component A "extends" a component B and both component A and component B exist in the linear ordering.

Method-Leved Optimization

In some embodiments, the operations of FIG. 2 include identifying unneeded component methods and omitting the instructions of the unneeded component methods from the component definition in the minified file 112.

Continuing a previous example, suppose the CustomList component in an application file 108 extends the List component defined in a library file 110. Further assume that the List component defines three methods: render( ), sort( ), and removeDuplicates( ). Also assume that the removeDuplicates( ) function is never called at runtime by a component defined in the application files 108 or a component defined in the library files 110. In this case, the instructions defining the removeDuplicates( ) function can be safely omitted from the definition of the List component in the minified file 112.

In some embodiments, method-level optimization involves static analysis of the application files 108 and the library files 110 for function call code patterns. For example, assume the CustomList component defined in an application file 108 includes the following code:

01: if (sortButtonWasClicked) {
02: productList.sort( );
03:}

For this exemplary call pattern, the static analysis (block 201) concludes that line 02 involves the invocation of the sort( )method of the List component. Performing a static analysis on the application file 108 will reveal which methods in which components are used. Consequently, a list of uncalled methods can be inferred. Based on this list, the minifer can prune these uncalled methods from the components written to the minified file 112.

Continuing the above example, if the application file 108 only ever calls the sort( ) and render( )method of the List component, but never calls the removeDuplicates( )method, and no other component in the application files 108 or the library files 110 calls the removeDuplicates( )method, then the minifer will generate (block 203) a minified file 112 that includes the List component with the sort( ) and render( )methods but without the removeDuplicates( )method.

Care must be taken that other methods that may indirectly call removeDuplicates( ) are not affected. For this, a similar dependency tracking technique which was used to track direct runtime dependencies between components may be used to track runtime dependencies between component methods. Here the static analysis (block 201) and dependency information generated therefrom is augmented to include runtime dependency information for component methods.

After the full dependency graph is created, cross referencing it with the application files 108 allow for marking all the nodes in the graph which are needed. The steps are generalized as follows:

1) Run static analysis
2) For each component method invocation code pattern
2.1) determine the callee component name
2.2) determine the type of the callee component
2.3) determine the callee component method name
2.4) mark the (component+method) node in the dependency graph as NEEDED
3.0) recursively find all other nodes in the dependency graph that "uses"
(component+method)

After this is completed, any node in the dependency graph which is not visited during the process are the component methods which can be omitted from the minified file 112.

In the foregoing specification, embodiments of the present invention have been described with reference to numerous specific details that may vary from implementation to implementation. Thus, the sole and exclusive indicator of what is the invention, and is intended by Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

performing a static analysis of a set of web application files to identify components declared by dynamic programming language instructions contained in the set of web application files and to identify direct runtime dependencies between the identified components, wherein performing the static analysis comprises parsing the dynamic programming language instructions to identify patterns indicative of component declarations and direct runtime dependencies between components;

storing runtime dependency information that reflects results of the static analysis;

using the runtime dependency information to determine which of the identified components are needed at runtime and which, if any, of the identified components are not needed at runtime, wherein one or more of the identified components are determined to be needed at runtime and one more of the identified components are determined not to be needed at runtime; and generating a single file comprising dynamic programming language instructions declaring the one or more identified components that are needed at runtime and omitting dynamic programming language instructions declaring the one or more identified components that are not needed at runtime;

wherein the runtime dependency information represents a dependency graph of nodes and directed edges between the nodes, each node of the graph representing a component identified by the static analysis and each directed edge of the graph from a node A to a node B representing a direct runtime dependency of the identified component corresponding to node A on the identified component corresponding to node B;

wherein the method is performed by a computing device.

2. The method of claim 1, wherein each direct runtime dependency is either an extends type direct runtime dependency or a uses type direct runtime dependency.

3. The method of claim 1, wherein the set of web application files comprises a set of one or more application files and a set of one or more library files; and wherein input to a topological sort comprises identifiers of components identified in the set of one or more application files.

4. The method of claim 1, wherein the set of web application files comprises a set of one or more application files and a set of one or more library files; and where input to a topological sort comprises identifiers of only leaf components identified in the set of one or more application files.

5. The method of claim 1, wherein generating the single file includes using the linear ordering to define components in the single file in an order that reflects the linear ordering.

6. The method of claim 1, wherein the dynamic programming language runtime interpreter is a scripting engine of a web browser.

7. The method of claim 1, wherein each component identified by the static analysis corresponds to a prototype definition or a class definition.

8. One or more non-transitory computer-readable media storing one or more sequences of instructions which, when executed by one or more processors, cause:

performing a static analysis of a set of web application files to identify components declared by dynamic programming language instructions contained in the set of web application files and to identify direct runtime dependencies between the identified components, wherein performing the static analysis comprises parsing the dynamic programming language instructions to identify patterns indicative of component declarations and direct runtime dependencies between components;

storing runtime dependency information that reflects results of the static analysis;

using the runtime dependency information to determine which of the identified components are needed at runtime and which, if any, of the identified components are not needed at runtime, wherein one or more of the identified components are determined to be needed at runtime and one more of the identified components are determined not to be needed at runtime; and generating a single file comprising dynamic programming language instructions declaring the one or more identified components that are needed at runtime and omitting dynamic programming language instructions declaring the one or more identified components that are not needed at runtime;

wherein the runtime dependency information represents a dependency graph of nodes and directed edges between the nodes, each node of the graph representing a component identified by the static analysis and each directed edge of the graph from a node A to a node B representing a direct runtime dependency of the identified component corresponding to node A on the identified component corresponding to node B.

9. The one or more non-transitory computer-readable media of claim 8, wherein each direct runtime dependency is either an extends type direct runtime dependency or a uses type direct runtime dependency.

10. The one or more non-transitory computer-readable media of claim 8, wherein the set of web application files comprises a set of one or more application files and a set of one or more library files; and wherein input to a topological sort comprises identifiers of components identified in the set of one or more application files.

11. The one or more non-transitory computer-readable media of claim 8, wherein the set of web application files comprises a set of one or more application files and a set of one or more library files; and where input to a topological sort comprises identifiers of only leaf components identified in the set of one or more application files.

12. The one or more non-transitory computer-readable media of claim 8, wherein generating the single file includes using the linear ordering to define components in the single file in an order that reflects the linear ordering.

13. The one or more non-transitory computer-readable media of claim 8, wherein the dynamic programming language runtime interpreter is a scripting engine of a web browser.

14. The one or more non-transitory computer-readable media of claim 8, wherein each component identified by the static analysis corresponds to a prototype definition or a class definition.

15. The method of claim 1, wherein using the runtime dependency information includes performing a topological sort of components identified by the static analysis to produce, as an output of performing the topological sort, a linear ordering of the identified components that are needed at runtime.

16. The one or more non-transitory computer-readable media of claim 8, wherein using the runtime dependency information includes performing a topological sort of components identified by the static analysis to produce, as an output of performing the topological sort, a linear ordering of the identified components that are needed at runtime.

\* \* \* \* \*